(12) United States Patent
Chang et al.

(10) Patent No.: US 11,572,014 B1
(45) Date of Patent: Feb. 7, 2023

(54) REDUCING ANIMAL VEHICLE COLLISIONS

(71) Applicant: GM Global Technology Operations LLC, Detroit, MI (US)

(72) Inventors: Kai-Han Chang, Madison Heights, MI (US); Thomas A. Seder, Fraser, MI (US); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/529,599

(22) Filed: Nov. 18, 2021

(51) Int. Cl.
*B60Q 9/00* (2006.01)
*B60K 35/00* (2006.01)
*G08G 1/01* (2006.01)
*G08G 1/16* (2006.01)
*G06F 16/953* (2019.01)

(52) U.S. Cl.
CPC .............. *B60Q 9/008* (2013.01); *B60K 35/00* (2013.01); *G08G 1/0108* (2013.01); *G08G 1/0129* (2013.01); *G08G 1/166* (2013.01); B60K 2370/178 (2019.05); G06F 16/953 (2019.01)

(58) Field of Classification Search
CPC .. B60Q 9/008; B60K 35/00; B60K 2370/178; G08G 1/0108; G08G 1/0129; G08G 1/166; G06F 16/953
See application file for complete search history.

(56) References Cited

U.S. PATENT DOCUMENTS

| | | | |
|---|---|---|---|
| 9,805,601 B1 * | 10/2017 | Fields | G08G 1/096827 |
| 9,922,374 B1 * | 3/2018 | Vose | G08G 1/0129 |
| 2004/0178894 A1 * | 9/2004 | Janssen | G01C 21/365 |
| | | | 348/148 |
| 2006/0201432 A1 * | 9/2006 | Pratt | G06Q 10/10 |
| | | | 119/51.02 |
| 2013/0048752 A1 * | 2/2013 | Gilon | F24S 40/20 |
| | | | 239/165 |
| 2013/0147983 A1 * | 6/2013 | Park | G06V 20/58 |
| | | | 348/222.1 |
| 2016/0052451 A1 * | 2/2016 | O'Kane | G01S 7/4813 |
| | | | 340/435 |
| 2016/0110383 A1 * | 4/2016 | Mowry | A01K 15/021 |
| | | | 707/758 |

(Continued)

FOREIGN PATENT DOCUMENTS

| | | | | |
|---|---|---|---|---|
| CN | 108319892 A | * | 7/2018 | ......... G06K 9/00362 |
| WO | WO-2013071330 A1 | * | 5/2013 | ............. G06Q 40/04 |

*Primary Examiner* — Chico A Foxx
(74) *Attorney, Agent, or Firm* — Vivacqua Crane, PLLC

(57) ABSTRACT

A driver alert system for an automobile includes a global positioning system adapted to monitor a location of an automobile, and a processor adapted to receive data from the global positioning system, receive data of historical wildlife position and migration habits within a pre-determined range from the automobile, calculate a distance from the automobile to an area of wildlife activity as indicated by the data of historical wildlife position and migration habits within the pre-determined range from the automobile, and provide an alert to a driver of the automobile when the data of historical wildlife position and migration habits indicates wildlife movement within the pre-determined range of the automobile and the automobile is within a triggering distance of such wildlife movement.

20 Claims, 3 Drawing Sheets

(56) References Cited

U.S. PATENT DOCUMENTS

| | | | |
|---|---|---|---|
| 2018/0027772 A1* | 2/2018 | Gordon | G05D 1/104 |
| 2018/0116166 A1* | 5/2018 | Van Den Berg | A01K 1/10 |
| 2020/0093100 A1* | 3/2020 | Harty | A01K 11/008 |
| 2020/0334762 A1* | 10/2020 | Carver | G06Q 40/08 |
| 2022/0076034 A1* | 3/2022 | Thompson | B60K 35/00 |

* cited by examiner

US 11,572,014 B1

REDUCING ANIMAL VEHICLE COLLISIONS

INTRODUCTION

The present disclosure relates to a system and method for providing an alert to a driver of an automobile when the automobile is traveling in an area where there is high wildlife activity.

Animals usually have erratic and unpredictable behavior that can put drivers and themselves in dangerous situations. Animal-automobile collisions can happen abruptly, especially in low-light conditions when drivers can't see the road ahead clearly. Such accidents not only cause harm and injury to the driver and passengers, but also to the animal that the automobile collided with.

Often, in areas where there is a known high level of wildlife activity, measures can be taken to prevent animal-automobile collisions. Signs are typically posted along roadsides where there is a known high level of wildlife activity. Unfortunately, drivers may fail to notice such signs or ignore them altogether as a normal fixture. In extreme situations, communities can construct barriers in an attempt to prevent wildlife from crossing roadways at a location and force wildlife to travel a different path. Such measures are expensive and cause interference with normal wildlife migration patterns.

Thus, while current measures achieve their intended purpose, more or less, there is a need for a new system and method for providing an alert to a driver of an automobile when the automobile is traveling in an area with high wildlife activity.

SUMMARY

According to several aspects of the present disclosure, a driver alert system for an automobile includes a global positioning system adapted to monitor a location of an automobile, and a processor adapted to receive data from the global positioning system, receive data of historical wildlife position and migration habits within a pre-determined range from the automobile, calculate a distance from the automobile to an area of wildlife activity as indicated by the data of historical wildlife position and migration habits within the pre-determined range from the automobile, and provide an alert to a driver of the automobile when the data of historical wildlife position and migration habits indicates wildlife movement within the pre-determined range of the automobile and the automobile is within a triggering distance of such wildlife movement.

According to another aspect, the system further includes a driver interface adapted to receive the alert from the processor and display the alert to the driver of the automobile.

According to another aspect, the driver interface is one of a head-up display and an instrument cluster display.

According to another aspect, the processor is adapted to monitor a current time and to provide an alert to a driver of the automobile when the data of historical wildlife position and migration habits indicates wildlife movement within the pre-determined range of the automobile at the current time.

According to another aspect, the processor is adapted to monitor a current date and to provide an alert to a driver of the automobile when the data of historical wildlife position and migration habits indicates wildlife movement within the pre-determined range of the automobile on the current date.

According to another aspect, the processor is adapted to receive data of historical wildlife position and migration habits by downloading data from a first publicly available database via the internet.

According to another aspect, the processor is adapted to download data of historical wildlife position and migration habits in one of real time and when prompted in anticipation of off-grid travel.

According to another aspect, the processor is adapted to receive real-time information of automobile-wildlife collisions from a reporting system and to provide an alert to a driver of the automobile when an automobile-wildlife collision has occurred within the pre-determined range of the automobile.

According to another aspect, the processor is adapted to receive historical information of automobile-wildlife collisions from a second publicly available database and to provide an alert to a driver of the automobile when automobile-wildlife collisions have occurred within the pre-determined range of the automobile.

According to another aspect, the processor is adapted to provide an enhanced alert when the data of historical wildlife position and migration habits indicates wildlife movement within the pre-determined range of the automobile at the current time and on the current date and directionality of the data indicates movement of wildlife toward the automobile.

According to several aspects of the present disclosure, a method of providing an alert to a driver of an automobile includes determining a current location of the automobile with a global positioning system, communicating the location of the automobile to a processor, receiving, with the processor, data of historical wildlife position and migration habits within a pre-determined range from the automobile, calculating, with the processor, a distance from the automobile to an area of wildlife activity as indicated by the data of historical wildlife position and migration habits within the pre-determined range from the automobile, and providing an alert to a driver of the automobile when the data of historical wildlife position and migration habits indicates wildlife movement within the pre-determined range of the automobile and the automobile is within a triggering distance of such wildlife movement.

According to another aspect, the providing an alert to a driver of the automobile when the data of historical wildlife position and migration habits indicates wildlife movement within the pre-determined range of the automobile further includes communicating the alert from the processor to a driver interface that is adapted to receive the alert from the processor and display the alert to the driver of the automobile.

According to another aspect, the method includes monitoring, with the processor, a current time, and providing an alert to a driver of the automobile when the data of historical wildlife position and migration habits indicates wildlife movement within the pre-determined range of the automobile at the current time.

According to another aspect, the method includes monitoring, with the processor, a current date, and providing an alert to a driver of the automobile when the data of historical wildlife position and migration habits indicates wildlife movement within the pre-determined range of the automobile on the current date.

According to another aspect, the receiving, with the processor, data of historical wildlife position and migration habits within a pre-determined range from the automobile further includes downloading data from a first publicly available database via the internet.

According to another aspect, the processor is adapted to download data of historical wildlife position and migration habits in one of real time and when prompted in anticipation of off-grid travel.

According to another aspect, the method further includes receiving, with the processor, one of real-time information of automobile-wildlife collisions from a reporting system and historical data of automobile-wildlife collisions from a second publicly available database, and providing an alert to a driver of the automobile when an automobile-wildlife collision has occurred within the pre-determined range of the automobile.

According to another aspect, the method further includes providing an enhanced alert when the data of historical wildlife position and migration habits indicates wildlife movement within the pre-determined range of the automobile at the current time and on the current date and directionality of the data indicates movement of wildlife toward the automobile.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
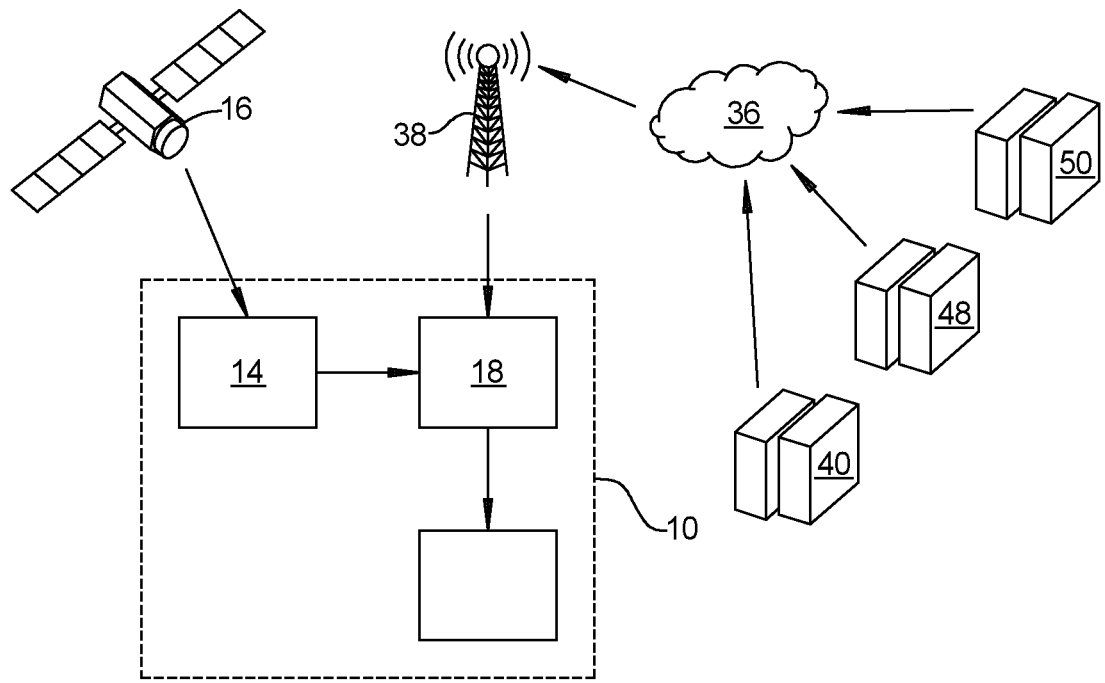
FIG. 1 is a schematic diagram of a system according to an exemplary embodiment of the present disclosure.

Referring to FIG. 1, a driver alert system 10 for an automobile 12, in accordance with the present disclosure includes a global positioning system (GPS) 14 that is adapted to monitor a location of the automobile 12. The GPS 14 is in communication with GPS satellites 16, and tracks the position of the automobile 12 and parameters such as direction of travel and speed.

A processor 18 is in communication with the GPS 14 and receives information from the GPS 14 relative to the location of the automobile 12. The processor 18 is also adapted to receive data of historical wildlife position and migration habits within a pre-determined range 20 from the automobile 12, calculate a distance 22 from the automobile 12 to an area 24 of wildlife activity as indicated by the data of historical wildlife position and migration habits within the pre-determined range 20 from the automobile 12, and provide an alert 26 to a driver of the automobile 12 when the data of historical wildlife position and migration habits indicates wildlife movement within the pre-determined range 20 of the automobile 12 and the automobile is within a triggering distance 28 of such wildlife movement.

Figure 2:
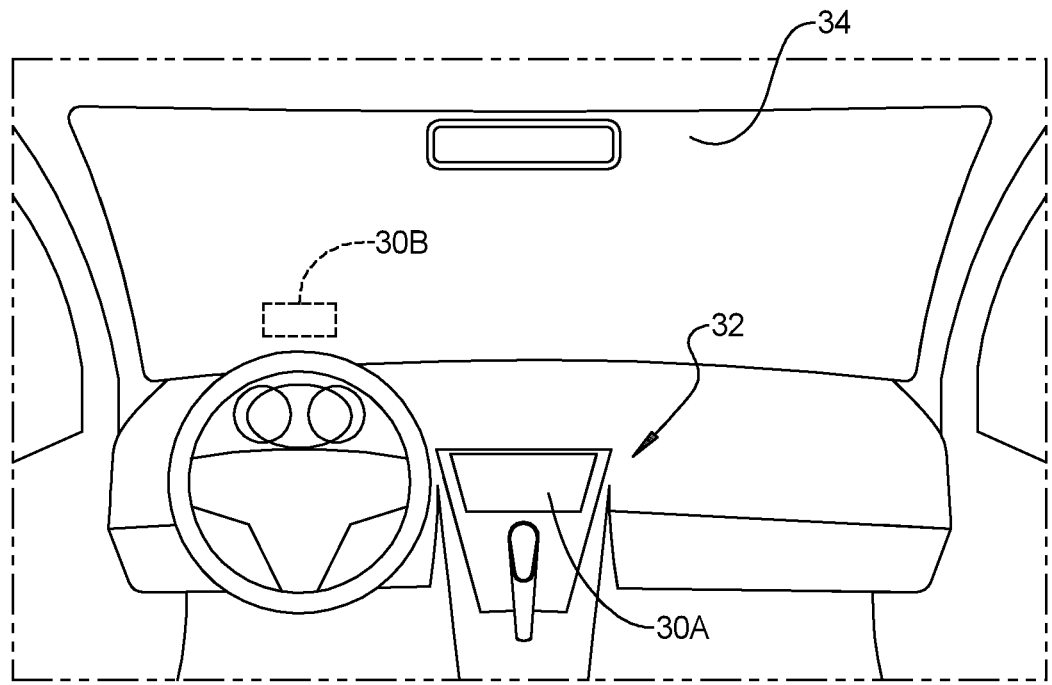
FIG. 2 is a perspective view of the interior of an automobile that includes a system according to an exemplary embodiment.

Referring to FIG. 2, the system includes a driver interface 30 adapted to receive the alert 26 from the processor 18 and display the alert 26 to the driver of the automobile 12. In one exemplary embodiment, the driver interface 30 is an instrument cluster display screen 30A positioned within an instrument panel 32 of the automobile 12. In another exemplary embodiment, the driver interface 30 is a head-up display 30B projected onto an inner surface of a windshield 34 of the automobile 12.

Referring again to FIG. 1, the processor 18 is in communication with the internet 36 via a wireless local area network (WLAN) 38. The processor 18 communicates with the WLAN 38 via known methods such as, but not limited to a GSM/GPRS (Global System for Mobile communication/General Packet Radio Service modem). When the automobile 12 is connected to the internet 36, the processor 18 is adapted to receive data of historical wildlife position and migration habits by downloading data from a first publicly available database 40 via the internet 36. One example of such a database 40 is provided by the United States Geological Survey (USGS) which has recently begun mapping herd location and migration routes of ungulates (hooved mammals such as deer, elk, pronghorn, moose and bison).

The migration mapping effort was facilitated by the Department of the Interior, which has brought greater focus to the need to manage and conserve big-game migrations. It builds on more than two decades of wildlife research enhanced by a technological revolution in GPS tracking collars. The research shows ungulates need to migrate in order to access the best food, which in the warmer months is in the mountains. They then need to retreat seasonally to lower elevations to escape the deep winter snow. Big-game migrations have grown more difficult as expanding human populations alter habitats and constrain the ability of migrating animals to find the best forage. The herds must now contend with the increasing footprint of fences, roads, subdivisions, energy production and mineral development. Additionally, an increased frequency of droughts due to climate change has reduced the duration of the typical springtime foraging bonanza.

Fortunately, maps of migration habitat, seasonal ranges and stopovers are leading to better conservation of big-game herds in the face of all these changes. Detailed maps can help identify key infrastructure that affect migration patterns and allow conservation officials to work with private landowners to protect vital habitats and maintain the functionality of corridors. Tracking of this information provides useful data on when and where movement of such animals is likely to intersect with roadways 42.

When the automobile 12 is connected to the internet 36, the processor 18 can download data from the first publicly available database 40 in real time to identify areas within the pre-determined range 20 of the automobile 12 that are known to have high wildlife activity. Alternatively, if a driver of the automobile 12 plans to travel on off-grid roads or trails, where connectivity will be limited, the driver may prompt the system 10 to download data of historical wildlife position and migration habits ahead of time.

Figure 3:
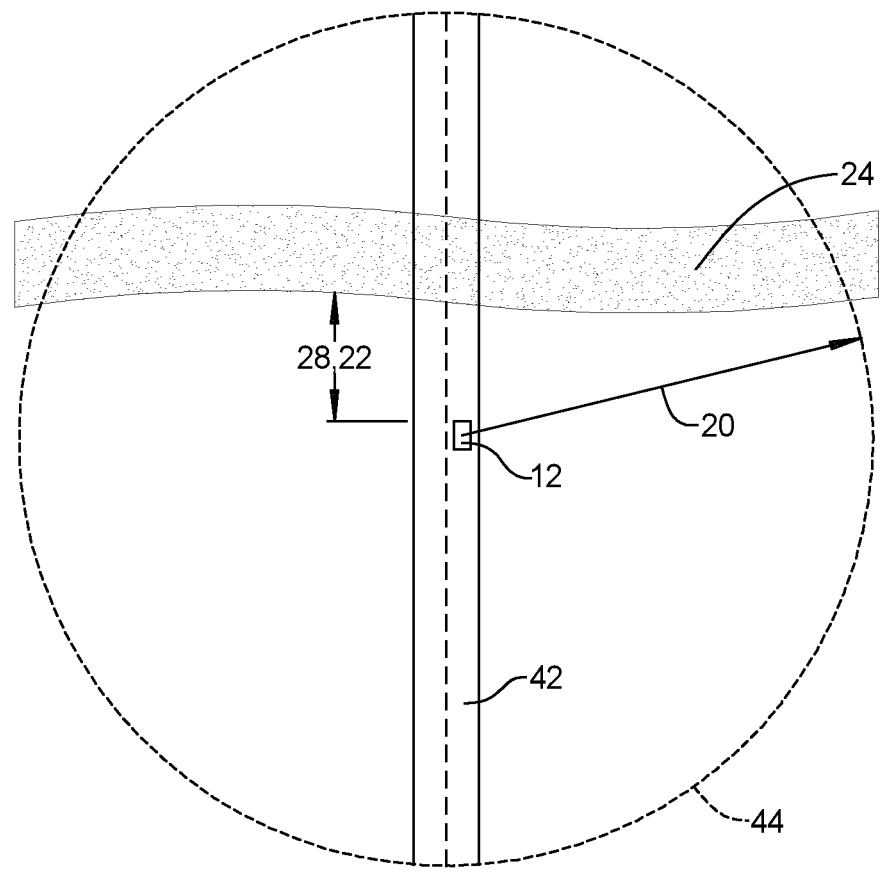
FIG. 3 is a schematic diagram illustrating the pre-determined range from the automobile and a wildlife migration path according to an exemplary embodiment.

Referring to FIG. 3, the processor 18 collects data from the first publicly available database 40 via the internet 36 for an area 44 within the pre-determined range 20 of the automobile 12. For example, the processor 18 may collect data to identify wildlife activity within a 50-mile radius of the automobile 12. As shown in FIG. 3, the processor 18 collects data of wildlife activity within the 50 mile radius of the automobile 12. As shown in this example, the data indicates a migration path 24 of wildlife that crosses the roadway 42. As the automobile 12 approaches the migration path 24, when the automobile 12 is within the triggering distance 28, such as 1 mile, from the migration path 24, the processor 18 sends an alert 26 to the driver interface 30 to let the driver know there is a likelihood of wildlife activity in the area 44 and increase the driver's awareness toward the roadway 42. The system 10 downloads data periodically, such as once an hour, to update the data as the automobile 12 travels.

The travel habits of many animals are dependent upon the time of day. Nocturnal animals, like bats, are active at night. Diurnal animals, like humans, are active during the day. Many ungulates are crepuscular, meaning they are active primarily at dawn and dusk. There's a very smart reason for picking these dimly lit in-between hours to be active. Crepuscular animals are avoiding predators. Many predators are most active at the peak hours of daylight and darkness, so animals which are a prey species for carnivores, are active during twilight hours when predators are already tired from a night of hunting, or are just waking up. Plus, it's tough to see during these hours, a fact that gives prey species an added edge in hiding from or escaping predators. Crepuscular activity also allows animals to be active when the temperature is most reasonable. Desert animals can escape the heat of midday and the chill of midnight by being active at dawn and dusk instead. And some species may shift from being nocturnal or diurnal to being crepuscular due to environmental factors such as competition with other species. Crepuscular activity is further broken down into matutinal animals, which are most active in the morning, and vespertine animals, which are most active at dusk.

In an exemplary embodiment of the present disclosure, the processor 18 is adapted to monitor a current time and to provide an alert 26 to a driver of the automobile 12 when the data of historical wildlife position and migration habits indicates wildlife movement within the pre-determined range 20 of the automobile 12 at the current time. For example, whitetail deer are crepuscular, and are most active during the early morning and early evening hours. If the automobile 12 is traveling in an area 44 known to have a large population of whitetail deer, the processor 18 may provide an alert 26 only during the early morning and early evening periods. Alternatively, the processor 18 may provide a general alert 26 when the automobile is traveling through this area 44 during mid-day and mid-night times to alert the driver to the presence of whitetail deer in the area 44 and draw the driver's attention to the roadway 42, and provide an enhanced alert 46 during the early morning and early evening times to provide a more noticeable alert to the driver during those times. The enhanced alert 46 may appear on the driver interface at more rapid intervals, or may appear in larger print or brighter colors, or may include an audible component to provide a more noticeable alert.

In another exemplary embodiment, the processor 18 is adapted to monitor a current date and to provide an alert 26 to a driver of the automobile 12 when the data of historical wildlife position and migration habits indicates wildlife movement within the pre-determined range 20 of the automobile 12 on the current date. For example, some ungulates migrate great distances depending on the season. Some species migrate from a summer feeding area to a wintering area during the fall, and migrate in the opposite direction from the wintering area to the summer feeding area in the spring. The likelihood of such wildlife crossing a roadway 42 that passes between their summer feeding area and their wintering area is only significant during the spring and fall seasons. The processor 18 will only provide an alert 26 to a driver of the automobile 12 during the spring and fall seasons. In some instances, the timing of such migrations is highly predictable, and the data collected by the processor 18 from the first publicly available database 40 can provide precise information on when an alert 26 should be provided within a given area.

In another exemplary embodiment, the processor 18 is adapted to receive real-time information of automobile-wildlife collisions from a reporting system 48 and to provide an alert 26 to a driver of the automobile 12 when an automobile-wildlife collision has occurred within the pre-determined range 20 of the automobile 12. Such a reporting system 48 may gather real time data via vehicle to vehicle communications, or as entered by other drivers related to incidents of automobile-wildlife collisions.

Alternatively, the processor 18 may be adapted to receive historical information of automobile-wildlife collisions from a second publicly available database 50 and to provide an alert 26 to a driver of the automobile 12 when automobile-wildlife collisions have occurred within the pre-determined range 20 of the automobile 12. One example of such a database 50 is the Fatality and Injury Reporting System Tool (FIRST) provided by the National Highway Traffic Safety Administration (NHTSA). This second publicly available database 50 may include relevant information regarding wildlife collisions indicating possible wildlife activity that is not reflected in the wildlife tracking data of the first publicly available database 40.

Figure 4:
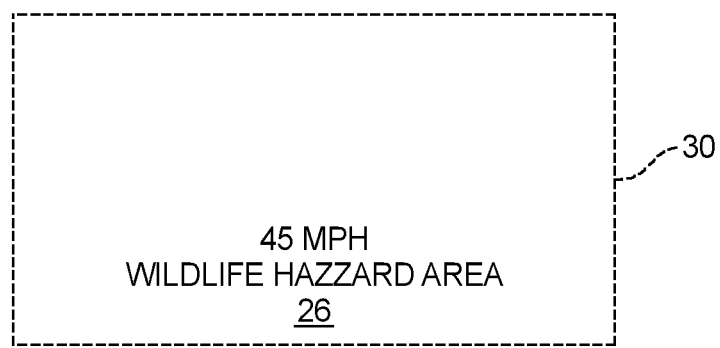
FIG. 4 is an illustration of a driver interface displaying an alert according to an exemplary embodiment.
Figure 5:
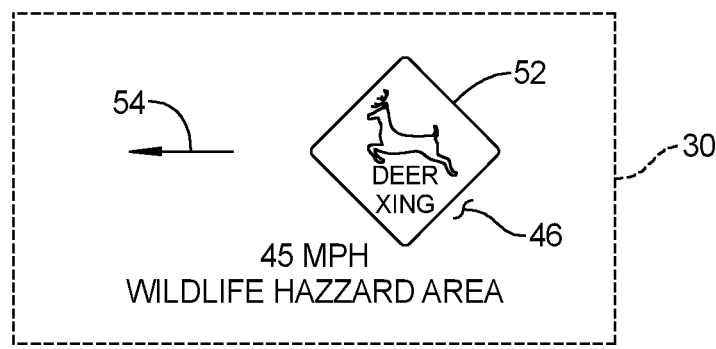
FIG. 5 is an illustration of a driver interface displaying an enhanced alert according to an exemplary embodiment.

Referring to FIG. 4, in an exemplary embodiment the processor 18 provides an alert 26 that displays text on the driver interface 30 suggesting a reduced "45 MPH" speed due to being in a "Wildlife Hazard Area". In another exemplary embodiment, the processor 18 is adapted to provide an enhanced alert 46 when the data of historical wildlife position and migration habits indicates wildlife movement within the pre-determined range 20 of the automobile 12 at the current time and on the current date and directionality of the data indicates movement of wildlife toward the automobile 12. Referring to FIG. 5. An example of such an enhanced alert 46 includes text on the driver interface 30 suggesting a reduced "45 MPH" speed due to being in a "Wildlife Hazard Area" and also includes a graphic 52 and an arrow 54 indicating the direction that wildlife is likely to be traveling to provide additional guidance to the driver to be alert to wildlife coming from that direction.

Figure 6:
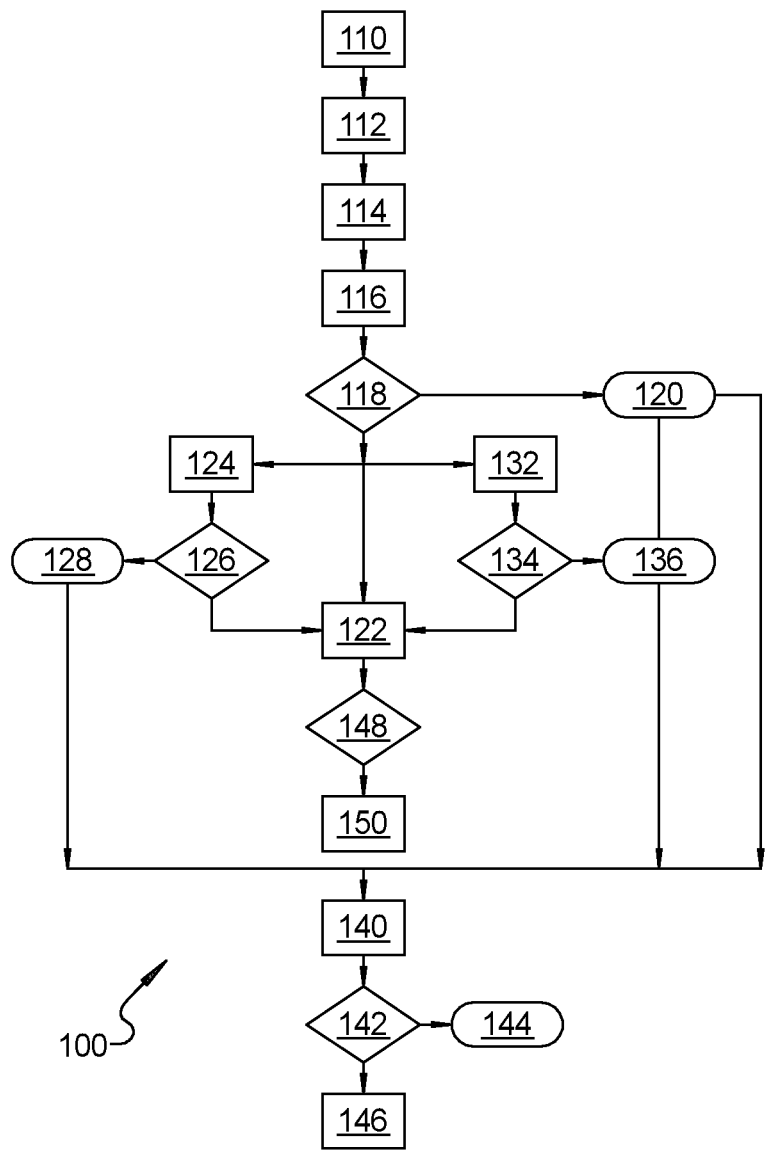
FIG. 6 is a flowchart illustrating a method of providing an alert to a driver of an automobile according to an exemplary embodiment.

Referring to FIG. 6, a method of providing an alert 26, 46 to a driver of an automobile 12 is shown schematically at 100. Starting at block 110, the method includes determining a current location of the automobile 12 with a global positioning system 14. Moving to block 112, the location of the automobile 12 is communicated to the processor 18. Moving to block 114, the method includes receiving, with the processor 18, data of historical wildlife position and migration habits within a pre-determined range 20 from the automobile 12. When the automobile 12 is connected to the internet 36, the processor 18 downloads data from the first publicly available database 40 in real time. If prompted by the driver, the processor 18 downloads data of historical wildlife position and migration habits ahead of time for travel on off-grid roads or trails.

Referring to FIG. 3, the processor 18 collects data from the first publicly available database 40 via the internet 36 for an area 44 within a pre-determined range 20 of the automobile 12. For example, the processor 18 may collect data to identify wildlife activity within a 50-mile radius of the automobile 12. As shown in FIG. 3, the processor 18 collects data of wildlife activity within the 50 mile radius of the automobile 12. As shown in this example, the data indicates a migration path 24 of wildlife that crosses the roadway 42.

Referring again to FIG. 6, moving to block 116, the method includes calculating the distance 22 from the automobile 12 to the area 24 of wildlife activity. Moving to block 118, if the distance 22 between the automobile 12 and the area 24 of wildlife activity is greater than the triggering distance 28, moving to block 120, no alert 26 is sent. If the distance 22 between the automobile 12 and the area 24 of wildlife activity is less than the triggering distance 28, moving to block 122, the method 100 includes providing an alert 26 to the driver interface 30 and the driver of the automobile 12. Referring again to FIG. 3, as the automobile 12 approaches the migration path 24, when the automobile 12 is within the triggering distance 28, such as 1 mile, from the migration path 24, the processor 18 sends an alert 26 to the driver interface 30 to let the driver know there is a likelihood of wildlife activity in the area and increase the driver's awareness toward the roadway 42.

In an exemplary embodiment of the method 100, at block 118, if the distance 22 between the automobile 12 and the area 24 of wildlife activity is less than the triggering distance 28, moving to block 124, the method 100 includes monitoring, with the processor 18, a current time. Moving to block 126, if the data of historical wildlife position and migration habits does not indicate wildlife movement within the pre-determined range 20 of the automobile 12 at the current time, moving to block 128, no alert 26 is sent. Moving again to block 122, if the data of historical wildlife position and migration habits indicates wildlife movement within the pre-determined range 20 of the automobile 12 at the current time the method includes providing an alert 26 to the driver of the automobile 12.

In another exemplary embodiment of the method 100, at block 118, if the distance 22 between the automobile 12 and the area 24 of wildlife activity is less than the triggering distance 28, moving to block 132, the method 100 includes monitoring, with the processor 18, a current date. Moving to block 134, if the data of historical wildlife position and migration habits does not indicate wildlife movement within the pre-determined range 20 of the automobile 12 at the current date, moving to block 136, no alert 26 is sent. Moving again to block 122, if the data of historical wildlife position and migration habits indicates wildlife movement within the pre-determined range 20 of the automobile 12 at the current date the method 100 includes providing an alert 26 to the driver of the automobile 12.

Beginning at any of blocks 120, 128 and 136, moving to block 140, the method 100 includes receiving, with the processor 18, one of real-time information of automobile-wildlife collisions from a reporting system 48 and historical data of automobile-wildlife collisions from a second publicly available database 50 of automobile-wildlife collisions. Moving to block 142, if no real time information or historical data of automobile-wildlife collisions is received, then moving to block 144, no alert 26 is sent. If either real time information or historical data is received by the processor 18 indicating that automobile-wildlife collisions have occurred within the pre-determined range 20 of the automobile 12, then, moving to block 146, the method 100 includes providing an alert 26 to the driver of the automobile 12.

Referring again to block 122 and moving to block 148, if the data of historical wildlife position and migration habits indicates wildlife movement within the pre-determined range 20 of the automobile 12 at the current time and on the current date and directionality of the data indicates movement of wildlife toward the automobile 12, moving to block 150, the method 100 includes providing an enhanced alert 46 to the driver interface 30 and the driver of the automobile 12. Referring to FIG. 5, an example of such an enhanced alert 46 includes text on the driver interface 30 suggesting a reduced "45 MPH" speed due to being in a "Wildlife Hazard Area" and also includes a graphic 52 and an arrow 54 indicating the direction that wildlife is likely to be traveling to provide additional guidance to the driver to be alert to wildlife coming from that direction.

A method 100 and system 10 of the present disclosure offers several advantages. These include providing an active alert 26, 46 to the driver of an automobile 12 when there is a likelihood of wildlife activity within a pre-determined range 20 of the automobile 12. This will alert the driver to the possibility of encountering wildlife so the driver can be more alert and potentially see such wildlife in the path of the automobile 12 prior to a collision.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A driver alert system for an automobile, comprising:
a global positioning system adapted to monitor a location of an automobile; and
a processor adapted to:
  receive data from the global positioning system;
  receive data of historical wildlife position and migration habits within a pre-determined range from the automobile;
  calculate a distance from the automobile to an area of wildlife activity as indicated by the data of historical wildlife position and migration habits within the pre-determined range from the automobile;
  provide an alert to a driver of the automobile when the data of historical wildlife position and migration habits indicates wildlife movement within the pre-determined range of the automobile and the automobile is within a triggering distance of such wildlife movement; and
  provide an enhanced alert when the data of historical wildlife position and migration habits indicates wildlife movement within the pre-determined range of the automobile at the current time and on the current date and directionality of the data indicates movement of wildlife toward the automobile.

2. The driver alert system of claim 1, further including a driver interface adapted to receive the alert from the processor and display the alert to the driver of the automobile.

3. The driver alert system of claim 2, wherein the driver interface is one of a head-up display and an instrument cluster display.

4. The driver alert system of claim 2, wherein the processor is adapted to monitor a current time and to provide an alert to a driver of the automobile when the data of historical wildlife position and migration habits indicates wildlife movement within the pre-determined range of the automobile at the current time.

5. The driver alert system of claim 4, wherein the processor is adapted to monitor a current date and to provide an alert to a driver of the automobile when the data of historical wildlife position and migration habits indicates wildlife movement within the pre-determined range of the automobile on the current date.

6. The driver alert system of claim 5, wherein the processor is adapted to receive data of historical wildlife position and migration habits by downloading data from a first publicly available database via the internet.

7. The driver alert system of claim 6, wherein the processor is adapted to download data of historical wildlife position and migration habits in one of real time and when prompted in anticipation of off-grid travel.

8. The driver alert system of claim 7, wherein the processor is adapted to receive real-time information of automobile-wildlife collisions from a reporting system and to provide an alert to a driver of the automobile when an automobile-wildlife collision has occurred within the pre-determined range of the automobile.

9. The driver alert system of claim 8, wherein the processor is adapted to receive historical information of automobile-wildlife collisions from a second publicly available database and to provide an alert to a driver of the automobile when automobile-wildlife collisions have occurred within the pre-determined range of the automobile.

10. The driver alert system for an automobile according to claim 1, wherein the processor communicates via a wireless local area network (WLAN).

11. A method of providing an alert to a driver of an automobile, comprising:
determining a current location of the automobile with a global positioning system;
communicating the location of the automobile to a processor;
receiving, with the processor, data of historical wildlife position and migration habits within a pre-determined range from the automobile;
calculating, with the processor, a distance from the automobile to an area of wildlife activity as indicated by the data of historical wildlife position and migration habits within the pre-determined range from the automobile;
providing an alert to a driver of the automobile when the data of historical wildlife position and migration habits indicates wildlife movement within the pre-determined range of the automobile and the automobile is within a triggering distance of such wildlife movement; and
providing an enhanced alert when the data of historical wildlife position and migration habits indicates wildlife movement within the pre-determined range of the automobile at the current time and on the current date and directionality of the data indicates movement of wildlife toward the automobile.

12. The method of claim 11, wherein the providing an alert to a driver of the automobile when the data of historical wildlife position and migration habits indicates wildlife movement within the pre-determined range of the automobile further includes communicating the alert from the processor to a driver interface that is adapted to receive the alert from the processor and display the alert to the driver of the automobile.

13. The driver alert system of claim 12, wherein the driver interface is one of a head-up display and an instrument cluster display.

14. The method of claim 12, including:
monitoring, with the processor, a current time; and
providing an alert to a driver of the automobile when the data of historical wildlife position and migration habits indicates wildlife movement within the pre-determined range of the automobile at the current time.

15. The method of claim 14, including:
monitoring, with the processor, a current date; and
providing an alert to a driver of the automobile when the data of historical wildlife position and migration habits indicates wildlife movement within the pre-determined range of the automobile on the current date.

16. The method of claim 15, wherein the receiving, with the processor, data of historical wildlife position and migration habits within a pre-determined range from the automobile further includes downloading data from a first publicly available database via the internet.

17. The method of claim 16, wherein the processor is adapted to download data of historical wildlife position and migration habits in one of real time and when prompted in anticipation of off-grid travel.

18. The method of claim 17, further including:
receiving, with the processor, one of real-time information of automobile-wildlife collisions from a reporting system and historical data of automobile-wildlife collisions from a second publicly available database; and
providing an alert to a driver of the automobile when an automobile-wildlife collision has occurred within the pre-determined range of the automobile.

19. The method of claim 11, wherein the processor communicates via a wireless local area network (WLAN).

20. A driver alert system for an automobile, comprising:
a global positioning system adapted to monitor a location of an automobile;
a driver interface that is one of a head-up display and an instrument cluster display; and
a processor adapted to:
receive data of historical wildlife position and migration habits within a pre-determined range from the automobile by downloading data from a first publicly available database via the internet in one of real time and when prompted in anticipation of off-grid travel;
monitor a current time and a current date;
provide an alert to the driver interface and a driver of the automobile when the data of historical wildlife position and migration habits indicates wildlife movement within the pre-determined range of the automobile at the current time and on the current date;
receive real-time information of automobile-wildlife collisions from a reporting system and historical information of automobile-wildlife collisions from a second publicly available database;
provide an alert to the driver interface and the driver of the automobile when automobile-wildlife collisions have occurred within the pre-determined range of the automobile; and
provide an enhanced alert to the driver interface and the driver of the automobile when the data of historical wildlife position and migration habits indicates wildlife movement within the pre-determined range of the automobile at the current time and on the current date and directionality of the data indicates movement of wildlife toward the automobile.

* * * * *